Patented June 30, 1931

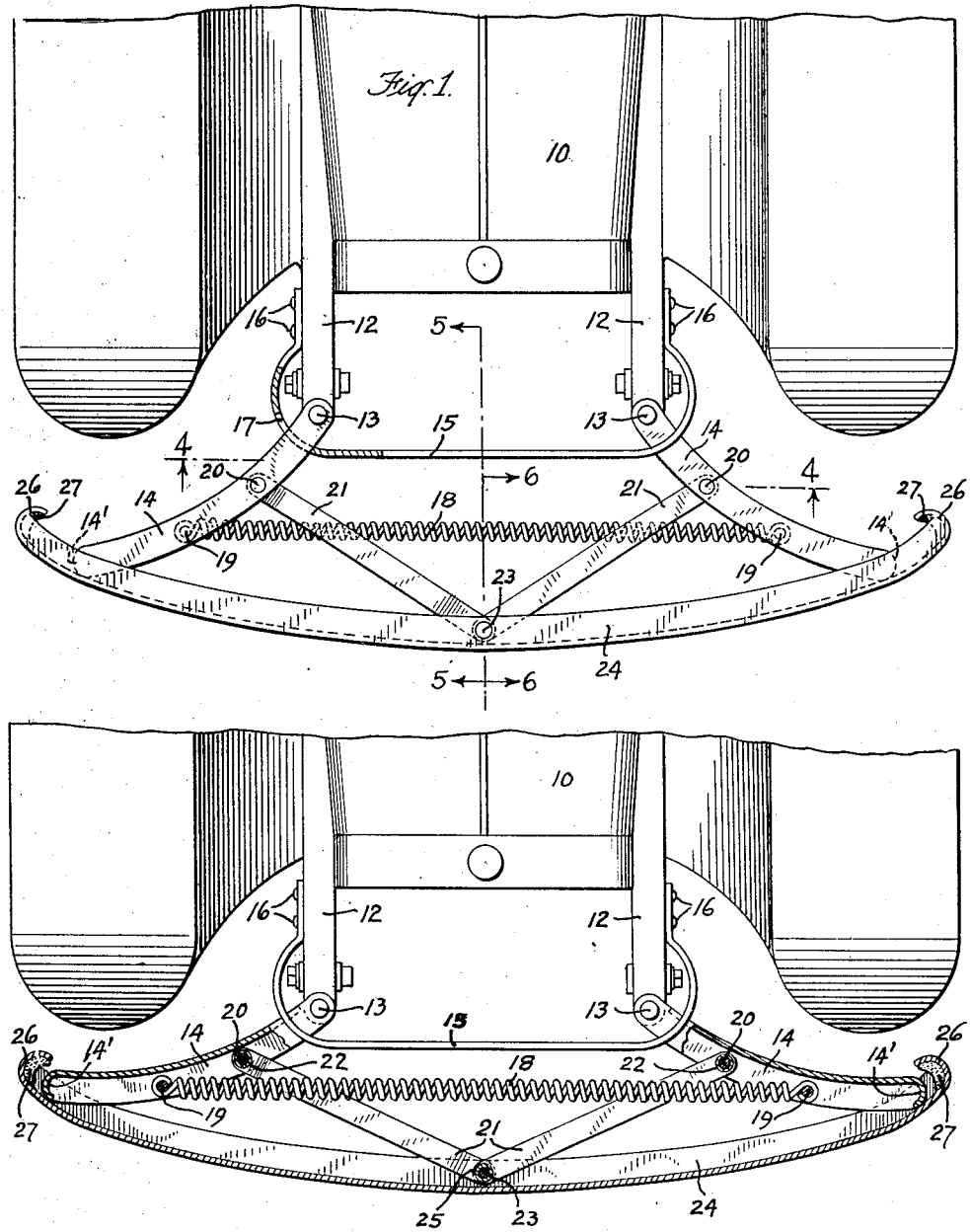

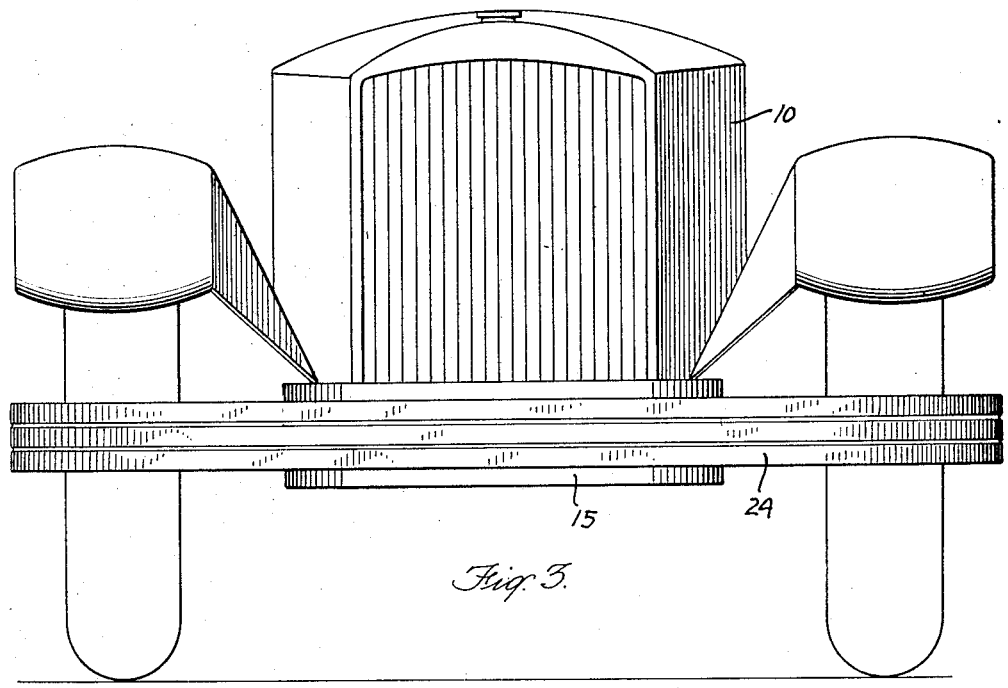
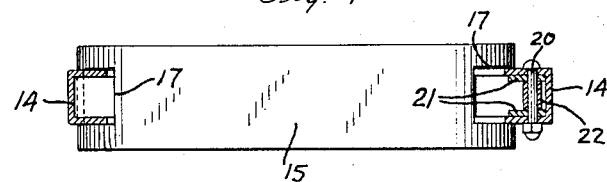
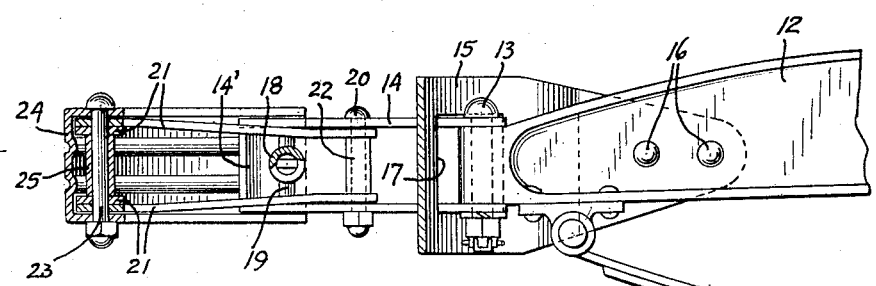
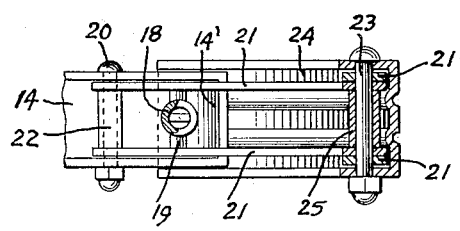

1,812,417

UNITED STATES PATENT OFFICE

ADOLPH A. THOMAS, OF NEW YORK, N. Y.

AUTOMOBILE BUMPER

Application filed April 17, 1930. Serial No. 444,955.

My invention is for an automobile bumper adapted to absorb the shock of a collision by the expansion of a tensioned coil spring or other elastic element arranged crosswise of the car. For this purpose I provide a pair of outwardly diverging levers pivoted to the car and connected by a tensioned elastic element. Two hinged toggle links are pivoted at their outer ends to the diverging levers, and a bumper bar is connected at the center to the hinge of the toggle links. When the bumper bar hits an obstruction, the toggle links tend to straighten and thereby spread the levers which in turn expand the elastic element. In this way the force of a head-on impact is translated crosswise of the car to the expanding spring. The outer ends of the diverging levers are in sliding engagement with the bumper bar, so that the latter is jointly supported by the levers and toggle links. The practical advantages and novel features of my invention will be understood from a description of the accompanying drawings, in which—

Fig. 1 shows in plan the front part of an automobile equipped with my new bumper, the latter being in normal position;

Fig. 2 shows the diverging levers and toggle links spread apart under the force of an impact, this view being partly in section for clearness;

Fig. 3 represents a front view of the bumper; and

Figs. 4, 5 and 6 are sectional views on lines 4—4, 5—5 and 6—6, respectively, of Fig. 1, except that Figs. 5 and 6 are on a larger scale.

The chassis of automobile 10 has the usual extensions 12 which carry pins or bolts 13 for supporting a pair of outwardly diverging levers 14. These levers are preferably channel-shaped and the pivot bolts 13 pass through the top and bottom flanges of the levers, as shown in Fig. 5. A bracket 15 is secured at its ends by bolts or rivets 16 to the chassis extensions 12, and the channel-shaped levers 14 pass through slots 17 in the bracket with just enough clearance to permit free swinging movement of the levers when necessary. The bolts 13 and bracket 15 cooperate to form a rigid support, not only for the diverging levers 14, but for the bumper structure as a whole. The bracket 15 is made of a single piece of heavy plate metal and takes any lateral strain off the pivot bolts 13.

An elastic element 18, which may be a coil spring, a rubber bar, or the like, is connected at its ends to levers 14 by means of pins 19 which are secured to the top and bottom flanges of the channel-shaped levers. The spring 18 is always under tension, and the inward movement of levers 14 under the contracting action of the spring is limited by the levers engaging the inner ends or shoulders of slots 17 in bracket 15. The diverging levers 14 carry a pair of pivot pins or bolts 20 to which the inner ends of toggle links 21 are connected. In the present instance these toggle links comprise two pairs of flat bars, which are held spaced at their inner ends by sleeves 22 on pivot bolts 20. The toggle links 21 converge forwardly and are hinged together by a bolt or pin 23 which is carried by a channel-shaped bumper bar 24. The bolt 23 passes through the top and bottom flanges of bar 24, and a sleeve 25 on the bolt holds the toggle links 21 properly spaced. The bumper bar 24 is a single piece of heavy metal capable of withstanding the force of collisions. The elastic element 18 passes through the spaced toggle links, so that neither interferes with the movements of the other. In some instances, the elastic element 18 may be attached directly to the toggle links 21 or to the connecting pins 20.

The outer ends 14' of levers 14 fit into the channel space of bumper bar 24, as clearly shown in Figs. 2 and 6, whereby the ends of the bar are supported by the levers. In other words, the levers 14 and toggle links 21 jointly constitute a movable support for the bumper bar 24. The supporting ends 14' of levers 14 are in slidable engagement with the bumper bar, which may terminate in projections 26 arranged to be engaged by the ends of levers 14 to limit the spreading movement of the latter. If desired, cushioning blocks 27 mounted in the recessed projections 26 may be interposed to soften the shock of a sudden contact with the adjacent ends of levers 14.

When the bumper bar 24 strikes an obstruction, the toggle links 21 and levers 14 are spread apart to stretch the elastic element 18, which thereby absorbs the shock of the impact in a direction transverse of the car. That is to say, the reaction developed by a collision spends itself in a direction at right angles to the longitudinal axis of the car by expanding the elastic member 18, so that the shock of the collision is absorbed (to a great extent at least) without being directly transmitted to the car and its occupants. By connecting the toggle links 21 to points between pivot pins 13 and 19, it takes a comparatively great force to expand the spring, because of the increased leverage exerted by the latter on the diverging levers 14. Putting this differently, I may say that a comparatively weak spring is capable of absorbing a heavy shock. This particular relation between the connecting points 19 of spring 18 and the connecting points 20 of toggle links 21 is not necessary in all cases, and will probably vary in different designs of bumpers for different makes and sizes of cars. By connecting the elastic element 18 near the outer ends of levers 14, it is possible to use a greater length of coil spring or rubber bar, and to obtain a higher rate of expansion of the elastic element for a certain inward movement of the bumper bar. The outer ends of levers 14 and bumper bar 24 are so shaped that they remain in contact in all positions of those parts, as will be clear by comparing Figs. 1 and 2. It will be understood that the vehicle 10 in the drawings represents any kind of automotive vehicle—automobile, truck, van, bus, etc., to which my bumper may be attached at either or both ends.

Although I have shown and described a specific construction, changes and modifications are possible within the scope of the invention as defined in the appended claims.

I claim as my invention:

1. A bumper structure for automobiles comprising a pair of outwardly diverging levers pivoted to the car, a pair of toggle links connected to said levers and converging forwardly, a bumper bar connected to said toggle links for spreading the same and said levers under the force of an impact, and elastic means arranged crosswise of the car and so mounted as to be expanded when said links and levers are spread apart.

2. A bumper structure for automobiles comprising a pair of outwardly diverging levers pivoted to the car, a pair of toggle links connected to said levers and converging forwardly, a bumper bar supported at the center by said toggle links and at the ends by said levers for spreading those two pairs of members under the force of an impact, and elastic means arranged to be expanded when said links and levers are spread apart.

3. A bumper structure for automobiles comprising a pair of outwardly diverging levers pivoted to the car, a pair of toggle links connected to said levers and converging forwardly, a bumper bar connected at the center to the apex of said toggle links for spreading the same and said levers under the force of an impact, and a tensioned elastic element connected at its ends to said levers, whereby the spreading of the levers expands said element.

4. A bumper structure for automobiles comprising a pair of outwardly diverging levers pivoted to the car, a pair of toggle links connected to said levers and converging forwardly, a bumper bar connected at the center to the apex of said toggle links for spreading the same and said levers under the force of an impact, and elastic means arranged crosswise of the car and so mounted as to be expanded when said links and levers are spread apart.

5. An automobile chassis having two extensions, a pair of outwardly diverging levers pivoted to said extensions, a bracket secured to said extensions and engaging said levers to guide and steady the same, a bumper bar connected to said levers for spreading them apart under the force of an impact, and elastic means adapted to be tensioned in a direction crosswise of the car when said levers are spread.

6. An automobile chassis having two extensions, outwardly diverging levers pivoted to said extensions, toggle links connected to said levers, said links being pivotally joined at a point substantially midway of said extensions, a bumper element for spreading said links and levers under the force of an impact, and elastic means adapted to be tensioned by the movement of said links and levers.

7. In a bumper structure for automobiles, a pair of outwardly diverging levers pivoted to the car, a tensioned elastic element connected to said levers and normally tending to pull them toward each other, stop means secured to the car and engaging said levers to limit the inward movement thereof under the contracting action of said elastic element, and a bumper bar connected to said levers for spreading the same apart under the force of an impact and thereby expand said elastic element.

8. A bumper structure for automobiles comprising a pair of outwardly diverging levers pivoted to the car, a pair of toggle links connected to said levers and converging forwardly, a bumper bar supported at the center by said toggle links and at the ends by said levers for spreading those two pairs of members under the force of an impact, elastic means arranged to be expanded when said links and levers are spread apart, and cooperating means on said bar and levers for limiting the outward movement of the latter.

9. A bumper structure for automobiles comprising a pair of outwardly diverging levers pivoted to the car, a pair of toggle links connected to said levers and converging forwardly, a channel-shaped bumper bar connected to said toggle links for spreading the same and said levers under the force of an impact, and a tensioned elastic element connected to said levers and arranged crosswise of the car, the outer ends of said levers projecting into the channel space of said bar to guide and steady the latter.

10. In a bumper structure for automobiles, a pair of outwardly diverging levers pivoted to the car, a tensioned elastic element connected to said levers and normally tending to pull them toward each other, a bracket secured to the car and having slots through which said levers project, the inner ends of said slots constituting stops to limit the inward movement of said levers under the contracting action of said elastic element, and a bumper bar connected to said levers for spreading the same apart under the force of an impact and thereby expanding said elastic element.

11. A bumper structure for automobiles comprising a pair of outwardly diverging levers pivoted to the car, a tensioned elastic element connected to said levers and arranged transversely of the car, a pair of toggle links connected to said levers and converging forwardly, said links being connected to said levers at points between the pivot supports of the levers and the connections of said elastic element, and a bumper bar connected to said toggle links for spreading the same and said levers under the force of an impact, said elastic element being adapted to expand when the levers are spread.

12. A bumper structure for automobiles comprising a pair of outwardly diverging levers pivoted to the car, a pair of toggle links connected to said levers and converging forwardly, said levers and links forming a toggle system adapted to expand transversely of the car, a bumper bar connected to said toggle system for expanding the same under the force of an impact, a tensioned elastic element arranged transversely of the car and connected to said toggle system, whereby said elastic element is adapted to expand with the toggle system, and means mounted on the chassis of the car and engaging said levers to limit the inward movement of the same under the contracting action of said elastic element.

13. A bumper structure for automobiles comprising a pair of outwardly diverging levers pivoted to the car, a tensioned elastic element connected to said levers and arranged transversely of the car, a pair of toggle links connected to said levers and converging forwardly, said links being connected to said levers at points between the pivot supports of the levers and the connections of said elastic element, and a bumper bar connected at the center to the apex of said toggle links for spreading the same and said levers under the force of an impact, said elastic element being adapted to expand when the levers are spread apart, the outer ends of said bar being in slidable engagement with the outer ends of said levers which thereby serve to guide and steady the bar.

14. A bumper structure for automobiles comprising a pair of outwardly diverging levers pivoted to the car, a tensioned elastic element connected to said levers and arranged transversely of the car, a pair of toggle links connected to said levers and converging forwardly, said links being connected to said levers at points between the pivot supports of the levers and the connections of said elastic element, a bumper bar connected at the center to the apex of said toggle links for spreading the same and said levers under the force of an impact, said elastic element being adapted to expand when the levers are spread apart, the outer ends of said bar being in slidable engagement with the outer ends of said levers which thereby serve to guide and steady the bar, and means whereby said levers and bar cooperate to limit the outward movement of said levers.

15. A bumper structure for automobiles comprising a pair of channel-shaped levers pivoted to the car and diverging outwardly, a vertical bolt or pin carried by each lever and passing through the top and bottom flanges of the lever, a pair of spaced links connected at one end to the bolt of each lever, said two pairs of links converging forwardly, a pin to which the converging ends of said two pairs of links are connected to form a toggle joint, a channel-shaped bumper bar connected at the center to said toggle pin, whereby said toggle links and levers are spread apart under the force of an impact, the outer ends of said levers engaging said bumper bar to guide and steady the same, a tensioned coil spring arranged transversely of the car and connected to said levers, whereby said spring expands when the levers are spread apart, said spring passing through said spaced toggle links, and means for limiting the inward movement of said levers under the contracting action of the spring.

16. A bumper structure for automobiles comprising a pair of outwardly diverging levers pivoted to the chassis extensions of a car, a pair of toggle links connected to said levers and converging forwardly, a bumper element for spreading said links and levers under the force of an impact, and an elastic element adapted to be tensioned by the movement of said links and levers, the length of said elastic element being greater than the distance between said extensions.

ADOLPH A. THOMAS.